3,084,102
FUNGICIDAL COMPOSITIONS
Alfred Ronald Martin, Macclesfield, England, assignor to Imperial Chemical Industries Limited, London, England, a corporation of Great Britain
No Drawing. Filed Oct. 7, 1960, Ser. No. 61,065
Claims priority, application Great Britain Oct. 14, 1959
5 Claims. (Cl. 167—65)

This invention relates to fungicidal compositions and more particularly it relates to fungicidal compositions comprising griseofulvin derivatives of the formula:

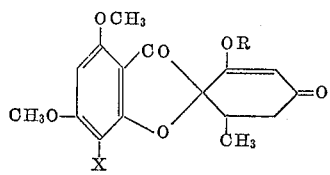

wherein X stands for hydrogen or for a halogen atom and R stands for a lower alkyl radical, provided that when X is a chlorine atom R does not stand for a methyl radical, as active fungicidal ingredient:

The substituent (X) may be for example a chlorine or bromine atom and the substituent (R) may be for example a methyl, ethyl, n-propyl or isopropyl radical.

As particularly useful compounds of the above stated formula there may be mentioned dechlorogriseofulvin also known as 4:6:2'-trimethoxy-6'-methylgris-2'-en-3:4'-dione (X=H; R=CH₃), 7-bromo-4:6:2'-trimethoxy-6'-methylgris-2'-en-3:4'-dione (X=Br; R=CH₃) and 7-chloro - 4:6 - dimethoxy-2'-n-propoxy-6'-methylgris-2'-en-3:4'-dione (X=Cl; R=n-C₃H₇).

The griseofulvin derivative is preferably present in the compositions in such proportion by weight that the proportion by weight of griseofulvin derivative in the formulation lies between 0.1% and 90%.

The excipients used in the production of these fungicidal carrier formulations are the excipients well known to the art, as are also the means of formulation.

Suitable compositions may be tablets wherein the griseofulvin is mixed with an inert diluent for example calcium carbonate or lactose in the presence of disintegrating agents for example maize starch and lubricating agents for example magnesium stearate. Aqueous suspensions may contain griseofulvin in aqueous media in the presence of a suspending agent for example sodium carboxymethylcellulose and dispersing agents. Suitable dispersing agents may be for example lecithin or condensation products of ethylene oxide with fatty acids for example polyoxyethylene stearate or with fatty alcohols for example heptadeca-ethyleneoxycetanol or with esters or partial esters derived from the fatty acids and hexitols for example polyoxyethylene sorbitol hexa-oleate, or with esters or partial esters derived from the fatty acids and hexitol anhydrides, for example hexitans derived from sorbitol, for example polyoxyethylene sorbitan monooleate. Oily suspensions may be formulated in a vegetable oil for example arachis oil which may contain preservatives.

The sterile aqueous suspensions may be formulated in the presence of suspending agents and dispersing agents. Suitable suspending agents may be for example sodium carboxymethylcellulose, sodium alginate or polyvinylpyrrolidone and suitable dispersing agents may be lecithin or the ethylene oxide condensation products described above for use as dispersing agents in the preparation of aqueous suspensions. Suitable oily preparations may be prepared by dispersing griseofulvin in an oily medium for example a vegetable oil for example arachis oil.

The invention is illustrated but not limited by the following examples in which the parts are by weight:

Example 1

80 parts of dechlorogriseofulvin are mixed with 12 parts of maize starch and 40 parts of a 10% maize starch paste are added. The mixture is dried and is then passed through a 16-mesh screen. 1 part of magnesium stearate is added and the granules are compressed to give tablets.

Example 2

A mixture of 1.5 parts of polyglyceryl ricinoleate and 0.1 part of sodium carboxymethylcellulose is stirred with 90 parts of distilled water. 10 parts of 7-bromo-4:6:2'-trimethoxy-6'-methylgris-2'-en-3:4'-dione are then added and the mixture is ball-milled. A stable suspension is thus obtained.

Example 3

5 parts of 7-chloro-4:6-dimethoxy-2'-n-propoxy-6'-methylgris-2'-en-3:4'-dione and 95 parts of lactose are milled together to obtain a composition suitable for use.

Example 4

100 parts of 7-bromo-4:6:2'-trimethoxy-6'-methylgris-2'-en-3:4'-dione in fine powder form is suspended in 870 parts of arachis oil according to the art, and there is thus obtained an oily dispersion.

Example 5

142 parts of dechlorogriseofulvin, 0.5 part of heptadecaethyleneoxycetanol and 900 parts of water are ball-milled for one hour. 10 parts of medium viscosity sodium carboxymethylcellulose are then added and ball-milling is continued for a further 4 hours until the bulk or mass of the griseofulvin in suspension is 50–60 microns.

Example 6

A solution is prepared by dissolving 1.5 parts of methyl p-hydroxybenzoate, 0.2 part of propyl p-hydroxybenzoate, 2.5 parts of refined soya bean lecithin and 8 parts of polyvinylpyrrolidone in 1000 parts of distilled water. The aqueous vehicle so obtained is sterilised by heating in an autoclave. To the sterile aqueous vehicle so obtained 158 parts of sterile micropulverised dechlorogriseofulvin are added. The resulting mixture is ball-milled for 15 minutes and there is thus obtained a suspension.

What I claim is:
1. Fungicidal compositions comprising a griseofulvin derivative of the formula:

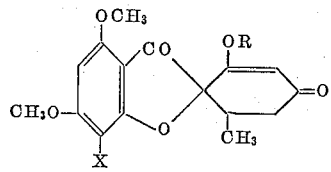

wherein X is selected from the group consisting of hydrogen and halogen, and R stands for a lower alkyl radical, provided that when X is a chlorine atom, R is a lower alkyl other than methyl, as active fungicidal ingredient, and an inert fungicidal carrier therefor.

2. Compositions as claimed in claim 1 wherein the substituent (X) is selected from the group consisting of a chlorine atom and a bromine atom.

3. Compositions as claimed in claim 2 wherein the substituent (R) is selected from the group consisting of a methyl, ethyl, isopropyl and n-propyl radical.

4. Compositions as claimed in claim 1 wherein the griseofulvin derivative is selected from the group consisting of 4:6:2' - trimethoxy - 6' - methylgris - 2' - en - 3:4'-dione, 7 - bromo - 4:6:2' - trimethoxy - 6' - methylgris-2' - en - 3:4' - dione and 7 - chloro - 4:6 - dimethoxy - 2'-n-propoxy-6'-methylgris-2'-en-3:4'-dione.

5. Compositions as claimed in claim 1 wherein the proportion by weight of griseofulvin derivative present in the formulation to be administered lies between 0.1% and 90%.

References Cited in the file of this patent

UNITED STATES PATENTS 2,900,304    Martin _____ Aug. 18, 1959

FOREIGN PATENTS 795,039    Great Britain _____ May 14, 1958

OTHER REFERENCES

Paget et al.: Nature, vol. 182, Nov. 8, 1958, pp. 1320–1321.